April 30, 1946. W. R. TRENT Re. 22,751

PROCESS OF TREATING FATTY GLYCERIDES

Original Filed Oct. 17, 1942

INVENTOR
WALTER RUSSELL TRENT
BY
ATTORNEY

Reissued Apr. 30, 1946

Re. 22,751

UNITED STATES PATENT OFFICE 22,751

PROCESS OF TREATING FATTY GLYCERIDES

Walter Russell Trent, North Arlington, N. J., assignor to Colgate-Palmolive-Peet Company, Jersey City, N. J., a corporation of Delaware Original No. 2,383,632, dated August 28, 1945, Serial No. 462,370, October 17, 1942. Application for reissue January 3, 1946, Serial No. 638,775

12 Claims. (Cl. 260—410.9)

Figures 1, 2:
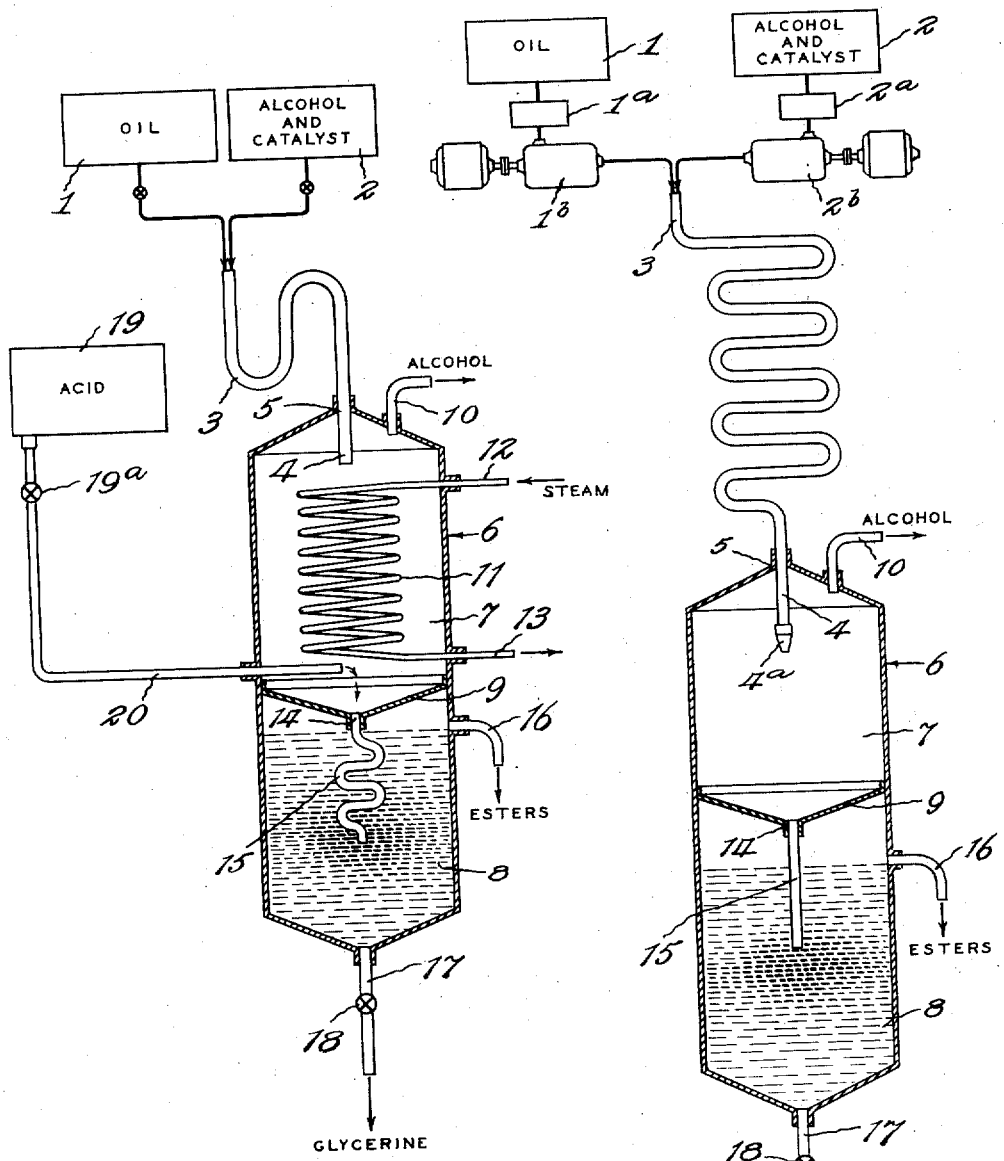

The present invention relates to a process for treating fatty materials and, more particularly, to an improved process for preparing fatty acid esters and for producing soap therefrom.

Soaps have been made from time immemorial by saponification of fats and oils. The saponification is generally carried out by intimately mixing such fats and oils with alkaline agents in such proportions as are readily determinable by those skilled in the art. The mixture is heated with agitation, forming soap and glycerine. After completion of the reaction, the soap is commonly salted out, leaving glycerine in solution which is thus separated from the soap. If more of the glycerine is to be removed, successive washings, resulting in considerable aqueous dilution of the glycerine, must be employed. The soap is put in a crutcher, where it is mixed with any desired adjuvant material, and may then be framed or dried, plodded and cut, or run in a plastic condition to steel rolls for flaking. The flakes may be left in this condition or may be ground. The plastic soap may also be forced through a nozzle in a spray tower to form beads or other finely divided particles. Continuous or semi-continuous processes of soap-making have been provided, but high temperatures and/or numerous washings are also employed in these for removing glycerine from the soap.

Recently, it has been taught to split fats or oils by hydrolysis with water to obtain free fatty acids, and then to saponify these acids. Free acids react very quickly and vigorously with alkaline agents, as compared with the long process of saponifying fats and oils, but it is difficult to control the reaction and the condition of the product at this speed. Contact of unpurified free fatty acids, particularly unsaturated acids, with air, even at moderate temperatures, causes the formation of dark oxidation products which tend to discolor soaps. Furthermore, the use of free acids requires that expensive, corrosion-resistant equipment be employed.

In the prior art, it has been taught that these various disadvantages can be obviated by reacting a fat or fatty oil with an alcohol in the presence of a small amount of an alcoholysis catalyst to produce esters of the fatty acid and glycerine, separating the esters from the glycerine, and reacting the esters with a saponifying agent. By the processes employed, the glycerine can be recovered in a relatively concentrated and substantially anhydrous condition, and soap can be produced from the fatty acid esters by a lower temperature process. However, the methods of alcoholysis described by the prior art have themselves had certain disadvantages. Thus, after alcoholysis with methanol, the reaction mixture was settled and a lower glycerine layer was withdrawn. The glycerine contained dissolved methyl alcohol which in turn kept some of the methyl esters in solution in the lower layer. Moreover, the upper layer contained some dissolved glycerine along with the methyl esters and alcohol. This required separate working up of the two layers. When ethyl or higher alcohols were used for the alcoholysis, separation of the glycerine was not immediately obtainable, and the prior art taught to wash out alcohol and catalyst with water to effect the separation. Furthermore, the recovered unreacted alcohol had to be dehydrated before reuse.

It is an object of the present invention to provide an improved process for reacting fatty glycerides with an alcohol to produce substantially quantitative yields of fatty esters and glycerine while removing unreacted alcohol in substantially anhydrous condition.

It is another object of this invention to provide a new method for rapidly and economically producing alkyl esters from fats and fatty oils.

Other objects and advantages of the invention will be apparent from the following description, taken in conjunction with the accompanying drawing, wherein:

Fig. 1 is a vertical sectional view, partly diagrammatic, of an apparatus adapted to carry out the process of the present invention; and Fig. 2 illustrates a similar view of a modification of this apparatus for carrying the process of the invention into practice.

According to this invention, a fatty glyceride is contacted with an alcohol in the presence of an alkaline alcoholysis catalyst for a relatively short time, and the mixture may be kept at room temperature or may be heated during a few minutes' interval to obtain rapid alcoholysis. The temperature is increased to vaporize unreacted alcohol, but preferably only to a temperature insufficient for substantial reversal of the reaction in the absence of the alcohol. It is a surprising feature of the present invention that, under proper temperature control, one of the reactants (viz., the alcohol) may be removed from the reaction mixture before washing out the catalyst without forcing the reaction to go in the reverse direction to any substantial extent. The theory of operation for this seeming exception to the law of mass action is not fully understood as yet, but the process of the invention has notable advantages over the prior art methods described supra. According to the present invention, the unreacted alcohol is removed in a single distillation and, moreover, in substantially anhydrous condition. Furthermore, since the residue contains substantially no alcohol as a common solvent for the glycerine and the alkyl esters, a sharp separation can be obtained upon settling the residue.

After removal of the unreacted alcohol, the residue is allowed to settle out, and glycerine, which separates out as a lower layer, is withdrawn. The upper layer containing alkyl esters, and in some cases incompletely reacted glycerides, is also removed for further processing. Where incompletely reacted glycerides are present, the upper layer is vacuum distilled to recover the esters in the distillate, and the distillation residue may be recycled to be reworked along with fresh materials. The alcoholysis and separation of glycerine may be carried out stepwise, if desired, adding more alcohol and alkaline alcoholysis catalyst to the upper layer after removal thereof, again contacting the reactants in a mixing device, again volatilizing the unreacted alcohol, and again separating and removing glycerine. This separation of glycerine may be repeated as many times as desired, the upper layer from the final separation being removed and treated as aforesaid and as will be described in greater detail infra.

In converting the esters into soaps, the upper layer may be treated in a variety of ways. It may be subjected to an intermediate water wash in batch, continuous concurrent or continuous countercurrent operation for the purpose of removing the alcoholysis catalyst, if desired. The upper layer from the glycerine settling, with or without washing, is then subjected to distillation and/or solvent extraction and/or other separation and purification procedure. As mentioned supra, the distillation residue may be recycled for treatment again or otherwise reworked, if desired, and the desired ester fractions from the distillation and/or extraction, etc., may be recovered.

In a preferred procedure, the fatty glyceride is passed together with alcohol and an alkaline catalyst through a contactor coil and the mixture is run, under reduced pressure if desired, over a bank of steam coils which are heated to an elevated temperature above the temperature of gelatinization of the resulting mixture due to soap formed by saponification of part of the glyceride by the catalyst and below the temperature of substantial homogeneity of said mixture (i. e., the temperature at which the mixture forms a single phase). The alcohol is volatilized, and the remainder of the mixture falls into a settling chamber where a lower glycerine layer can be withdrawn. In an alternative procedure, the mixture may be contacted under superatmospheric pressure at an elevated temperature for a short period, say about ten minutes, and then released into a lower pressure zone to flash off the unreacted alcohol. The remainder of the mixture passes to the settling chamber. Although high temperatures may be advantageously employed in the flashing for substantially complete volatilization of the alcohol, the operation is preferably controlled so that the end temperature is below the temperature of substantial reversal of the reaction upon removal of the alcohol and, more preferably, below the temperature of substantial homogeneity of the resulting mixture.

After distilling off alcohol, the soap formed by reaction of the fatty glyceride with the alkaline catalyst gels if the temperature is substantially decreased. There is relatively little tendency to gel when carrying out the alcoholysis with methyl alcohol, but this tendency increases with an increase in the molecular weight of the alcohol employed. The residue may therefore be treated before cooling with a brine solution to salt out the soap or with acid to form free fatty acids, and the glycerine layer may be thereafter withdrawn, or, preferably, the residue may be settled while still hot and the glycerine layer withdrawn to be thereafter treated with brine or acid, as aforesaid. Glycerine may be removed from the soap-containing glycerine layer by heating in an inert atmosphere to a temperature above the melting point of the resulting anhydrous soap while passing steam or other inert gas therethrough or by flash distillation.

The upper layer, containing the alkyl esters, may also contain monoglycerides and diglycerides. The alkyl esters can be removed from this layer by vacuum distillation, and according to a preferred procedure, the distillation need not be carried to the end, since the distillation residue containing the partially reacted material is reworked. Thus, in this modification, nothing but glycerine and volatile alkyl esters are removed from the system, and the overall yield must be substantially quantitative. If any unsaponifiable material is present in the fat or oil, this tends to increase in the recycle operation, and a small stream can be bled from the recycle, if desired, to receive final treatment separately.

In carrying out the alcoholysis, the temperature may be regulated as desired. In general, however, an early increase in temperature tends to accelerate the saponification of the glyceride by the alkaline catalyst before completion of the alcoholysis, which is an undesirable result. For this reason, temperatures of above 60° C. are usually to be avoided at the start of the reaction, and satisfactory results have been obtained when operating at about 40° C. to about 50° C., especially in ethanolysis, although with low temperatures longer times of contact are preferred. In increasing the temperature to volatilize the alcohol, it is advantageous to carry out such volatilization below the temperature of substantial reversal of the reaction upon removal of the alcohol and preferably below the temperature of substantial homogeneity of the resulting mixture. This temperature of homogeneity varies somewhat, depending upon the character of the fatty acid radical involved. In general, with coconut oil and oils having a mixture of glycerides of like molecular weight, temperatures below about 130° C. give satisfactory results, and, with most glycerides, a temperature of about 110° C. to about 123° C. has been found to provide rapid removal of the lower alcohols, especially at reduced pressures, without homogeneity or substantial reversal. In general, the operation may be carried out at reduced pressures, at atmospheric pressure or at superatmospheric pressures.

The glycerine separation may also be carried out stepwise, as noted above. After removal of the lower glycerine layer in the settling chamber, additional alcohol and alkaline alcoholysis catalyst can be added to the upper layer containing alkyl esters and unreacted material. The liquid body thus formed is again thoroughly contacted and is passed to another settling tank. The contacting of the liquid body may be as described above, with volatilization of alcohol, or the unreacted alcohol may be permitted to pass into the settling tank with the alkyl esters, although some of the advantages of this invention are lost by this latter procedure. Glycerine again settles out, with or without prior removal of alcohol and/or acidification as may be desired or dictated by the operation conditions, and the glycerine is removed. The upper layer can be retreated with alcohol and catalyst as many times as desired before vacuum distillation.

The fat and/or fatty oil treated may be any of those suitable for employment by the soap-making art in any of the processes heretofore known, especially those containing glycerides of fatty acids having about 8 to about 26, and preferably about 12 to about 20, carbon atoms per molecule. These include coconut oil, palm oil, olive oil, cottonseed oil, corn oil, tung oil, wool fat, tallow, whale and fish oils, soya bean oil, etc. It is preferred to use a refined oil containing substantially no moisture, as alcoholysis with an alkaline alcoholysis catalyst has its greatest effectiveness under anhydrous conditions. The presence of excessive free fatty acid is also deleterious, as it destroys the alcoholysis catalyst by converting it into soap. If sufficient alkaline catalyst is added to give an excess of alkali above that destroyed by large amounts of free fatty acid present, a large amount of soap forms and gels, which interferes with the separation of the alcoholysis mixture. Even if the separation is accomplished, practically all of the soap goes to the glycerine layer and must be recovered during the glycerine refining. Where an acidification step is included before separation into two phases, the fatty acid goes into the ester layer.

The refining of the oil may be accomplished by any suitable process. However, economies can be effected by using unrefined oil and introducing a preliminary alcohol refining treatment before the alcoholysis. In a suitable procedure, the unrefined oil is extracted with methanol or ethanol containing, at most, only a small percentage of water, using either batch, continuous concurrent or continuous countercurrent methods. Free fatty acids and moisture present in the oil are extracted by the alcohol, and the refined dry oil saturated with the alcohol can be removed therefrom. The oil, thus refined, may be used directly for alcoholysis. The alcohol extract, containing fatty acids and moisture, is then treated with an acid esterification catalyst and is dehydrated. The free fatty acids and the alcohol are completely esterified to the methyl or ethyl esters. These esters may then be worked up separately from the main body of esters formed in the alcoholysis of the refined glyceride, or they may be mixed with the main body of esters at any time before or during purification. In this way, acid and alkaline catalysts can be used to neutralize each other. After neutralization, if desired, the excess alcohol is distilled off, leaving lower alkyl esters which may be distilled, extracted with a selective solvent and/or otherwise purified before being converted to soap or used for other purposes.

In carrying out the alcoholysis according to this invention, short chain aliphatic alcohols, including aryl-substituted aliphatic alcohols, are preferably employed, particularly the saturated, primary alcohols, especially alcohols having a boiling point in the presence of excess water of lower than 100° C. at atmospheric pressure and, more particularly, the lower alcohols having 1 to about 6 carbon atoms per molecule. Thus, alcohols satisfactory for use in forming esters with the fatty acid components of the glycerides treated include such low molecular weight monohydric alcohols as methyl alcohol, ethyl alcohol, propyl alcohol, isopropyl alcohol, n-butyl alcohol, isobutyl alcohol, tertiary butyl alcohol, the amyl alcohols, benzyl alcohol, etc. It is preferred to employ an amount of alcohol at least about twice the calculated theoretical amount necessary for alcoholysis of the particular glycerides treated and to maintain substantially anhydrous conditions during the alcoholysis. Better yields are obtainable by mixing the reactants in the cold, say at about room temperature, and then heating the mixture to the desired temperature, than when preheating is employed.

In selecting an alcoholysis catalyst, an alkaline or a neutral catalyst may be employed. Among those which have been found suitable for use in the present process are sodium hydroxide, sodium methylate, sodium carbonate, lime, boron trifluoride, organic sulphonates, etc. While it is possible to obtain good yields with very small amounts of catalyst if sufficient time is allowed for the reaction, proportions of about 0.08 mol to about 0.30 mol of catalyst per mol of fatty glyceride are preferably employed.

The esterified material may be treated in any of several ways, as aforesaid. The ester layer from the settling chamber may be washed with water or treated with an agent for neutralizing the alcoholysis catalyst. This washing step may be accomplished by a batch method or may be done in a tower with concurrent or countercurrent contacting of the washing agent in continuous operation. The washing may be combined with any further treatment of the crude esters or may be omitted, or, if desired, the crude esters may be passed with or without washing and without subsequent treatment to a saponification step. The crude esters, free of alcohol by volatilization thereof with or without washing and/or other methods, may be passed to a distillation apparatus, preferably a vacuum still, where most of the volatile matter is distilled off. The distillate is a colorless alkyl ester fraction and, if any glycerol is carried into the ester layer upon removal from the settling tank, such glycerol also goes into the distillate and may be separated from the esters as a heavy lower layer. The distillation residue, containing unreacted triglycerides and partially reacted monoglycerides and diglycerides, can be returned to the alcoholysis reaction vessel, there to be reworked. If desired, the residue in the cases of alcoholysis of fish oils, palm oil and the like can first be subjected to fractional distillation, to extraction with selective solvents, and/or to other suitable procedures for removal of vitamins and other valuable byproducts before reworking.

The upper layer from the settling tank may be purified by any one or more of various purification procedures. Thus, it may be fractionally distilled to remove the lower esters, which are not as suitable for forming soaps. By conducting the distillation at subatmospheric pressure, the esters of the $C_8$ and $C_{10}$ fatty acids, if present, are topped off in a fractionating column. The esters of the $C_{12}$, $C_{14}$, $C_{16}$ and $C_{18}$ acids can be drawn off at a lower point on the column and, if desired, can be further fractionated and recombined in preferred proportions of desired components. These can then be worked up to soap, with or without other preliminary treatment, as described infra.

Another method of purification of the ester layer which may be used either alone or in combination with the fractional distillation procedure just described, with or without washing, is a liquid-liquid extraction with a selective solvent which is at least partially immiscible with the esters. A polar solvent, such as furfural, sulphur dioxide, nitromethane, methyl alcohol, ethyl alcohol, ethylene glycol, allyl alcohol, ethyl sulphate, acetaldehyde, acetamide, dichlorodiethyl ether, methyl Carbitol, etc., is employed to extract the more polar components of the ester layer, that is, the esters of the lower chain fatty acids, the more unsaturated fatty acids and the fatty acids having the greater number of hydroxy groups. In this manner, by a suitable selection of solvents, the stearic acid esters may be separated, either with or without oleic acid esters, from linoleic and linolenic acid esters and from shorter chain acid esters. A solvent for the longer chain acid esters and/or for the more saturated acid esters may be employed in admixture with the polar solvent. Thus, aliphatic, cycloaliphatic and aromatic hydrocarbons, such as pentane, cetane, cyclohexane, and benzene, may be used for this purpose. It may also be advantageous to add water to the mixture, as certain of the solvents become more selective in the wet state than in the anhydrous state.

Where such solvent extraction purification step is combined with a fractional distillation purification step, either step may follow the other, as desired. The combination of these two modes of purification has been found to provide a more complete fractionation of the ester layer into its components than is possible with either method alone. Other suitable methods of separation and purification, such as fractional crystallization, may also be employed either alone or in combination with each other and/or with either or both of fractional distillation and solvent extraction.

The process of the present invention will now be described with respect to certain embodiments and in connection with preferred apparatus for carrying the same into practice. Reference will be had to the accompanying drawing, wherein like characters denote corresponding parts in the respective figures.

Referring to Fig. 1, reference characters 1 and 2 indicate supply tanks for holding fatty oil and for holding alcohol having an alkaline alcoholysis catalyst dissolved therein, respectively. An outlet at the bottom of each tank communicates through a conduit with a Y at the upper end of a contactor coil 3 adapted for turbulently mixing material passing therethrough. The lower or outlet end 4 of the coil protrudes through a port 5 at the top of an alcoholysis tank 6. This tank is divided into an upper portion 7 and a lower portion 8 by a partition 9, and there is a vapor outlet 10 at the top of the tank adjacent the port 5. The outlet 10 is connected to evacuating means, not shown in the figure. The upper portion or volatilization chamber 7 of the tank is equipped with a steam coil 11, which is part of a closed steam system. The steam coil is serially connected through a steam inlet 12 and a condensate outlet 13 with a boiler adapted to furnish steam at required temperature and pressure to the coil.

The partition 9 is of inverted conical shape and has an orifice 14 at its center. A long tube 15 with reverse bends fits into this orifice and extends downward into the lower portion or separation chamber 8 of the tank, having the lower end of said tube 15 at the middle part of said separation chamber. At the side of the tank, below the partition 9 but above the lower end of the tube 15 there is an overflow outlet 16, and the bottom of the separation chamber is conical and has an outlet 17 at its center. A valve 18 below the bottom outlet 17 is adapted to control the flow of materials through said outlet. An acid supply tank 19 connects through a valve 19a with a conduit 20, which extends into the volatilization chamber of the tank and has its outlet end below the steam coil 11. The contactor coil may be jacketed for any desired portion of its length for the flow of steam, flue gases or the like, whereby temperature conditions within the coil may be regulated.

The operation of this device will now be described in connection with the following examples which are merely illustrative of the invention. It will be understood that the invention is not limited thereto.

*Example I*

About 215 parts by weight per minute of dry, refined coconut oil are passed from the oil supply tank 1 into the inlet of the contactor coil 3 in confluence with about 65.6 parts per minute of methanol from the supply tank 2 containing solid sodium hydroxide dissolved therein in the proportion of about 1 part by weight of sodium hydroxide to 40 parts of methanol. The contactor coil is of such dimensions that it contains about 5,000 parts by weight of material. The materials are turbulently mixed in the contactor coil at about room temperature, and the mixture flows from the outlet 4 of said coil into the volatilization chamber 7 at the upper portion of the alcoholysis tank 6. The volatilization chamber is under an absolute pressure of about 2 inches of mercury. The reaction mixture, containing methyl esters of the coconut oil fatty acids and glycerine, with some of the glycerides only partially reacted, flows downward over a series of steam coils, and steam is supplied to these coils at a gauge pressure of about 18 to about 20 pounds per square inch. The steam coils are at a temperature of about 125° C., and, in passing over them, the unreacted alcohol is volatilized and is removed from the volatilization chamber through the vapor outlet 10, whereafter it is condensed and recovered. The esters and glycerine, substantially free of alcohol, fall to the bottom of the volatilization chamber and, flowing down the upper surface of the partition 9, pass through the orifice 14 therein and are conducted by the tube 15 to the middle portion of the separation chamber 8 in the lower portion of the alcoholysis tank. The glycerine settles to the bottom of the separation chamber and is withdrawn through the outlet 17. The upper layer containing methyl esters and partially reacted glycerides overflows through the outlet 16. A portion of the upper layer is used as such without further treatment, and a second portion is subjected to vacuum distillation. The distillate of the second portion comprises the crude methyl esters of the coconut oil acids, and the distillation residue, comprising partially reacted glycerides, is returned to the inlet end of the contactor coil for retreatment.

*Example II*

Referring again to Fig. 1, corn oil, refined and substantially anhydrous, is run from the supply tank 1 into the inlet end of the contactor coil 3 at the rate of about 295 parts per minute. Ethyl alcohol containing about 0.8% of sodium hydroxide is run from tank 2 into the inlet end of the contactor coil at a rate of about 140 parts per minute. The contactor coil is of such dimensions that it contains about thirty to about forty minutes' run of materials, and the coil is heated for about the outlet half of its length to a temperature of about 45° C. The materials, thoroughly and turbulently mixed therein, are delivered from the outlet end of the coil to the outer surface of steam coils 11 in the volatilization chamber 7 of the alcoholysis tank 6. The pressure within the chamber 7 is maintained at about 2 inches of mercury absolute, and the steam pressure within the coils 11 is kept at about 10 pounds per square inch gauge, giving a temperature of about 115° C. The unreacted ethyl alcohol is volatilized and removed through the vapor outlet 10, and the hot reaction products flow down the upper surface of the partition 9 and are there contacted with sulphur dioxide from the supply tank 19. The flow of the sulphur dioxide is regulated through the valve 19a, and it is delivered from the conduit 20 in sufficient amount to destroy any soap formed from saponification of the corn oil with the sodium hydroxide catalyst. The materials flow through the orifice 14 and are thoroughly mixed in the tube 15. The reaction products pass into the chamber 8 and separate into two layers, the glycerine layer being withdrawn at the bottom through the outlet 17 and the valve 18, and the upper layer overflowing through the outlet 16. The treatment of the upper layer comprising ethyl esters of corn oil, fatty acids and partially reacted glycerides is the same as described with respect to the treatment of the upper layer in Example I.

The apparatus shown in Fig. 2 is similar to Fig. 1. Two tanks, an oil supply tank 1 and an alcohol and catalyst supply tank 2, are connected through heat transfer units 1a and 2a, respectively, and pumps 1b and 2b, respectively, with a Y at the upper end of a contactor coil 3. The lower end 4 of the coil passes through a port 5 in the top of the alcoholysis tank 6 and terminates in a nozzle 4a adapted for sudden release of the pressure on the material in the coil. As in Fig. 1, the tank is divided into an upper chamber 7 and a lower chamber 8 by a partition 9 of inverted conical shape. The upper chamber serves as a flash chamber, and there is a vapor outlet 10 at the top thereof adjacent the port 5, which outlet is connected to evacuating means, not shown. An orifice 14 in the partition 9 is fitted with a long tube 15 which extends downwardly to about the middle portion of the lower or separation chamber 8. The separation chamber is equipped with an overflow outlet 16 and with a centrally disposed bottom outlet 17, as described with respect to the modification of the apparatus depicted in Fig. 1.

In a further modification of the device, the contactor coil and/or the flash chamber may be jacketed for the flow of steam, flue gases or the like around the coil and/or flash chamber, whereby the temperature conditions therewithin may be controlled as desired.

A mixture of about 285 parts by weight of tallow with about 215 parts of coconut oil is dried, heated to about 120° C. and pumped into a contactor coil 3, as shown in Fig. 2, at the rate of about 500 parts per minute. A methyl alcoholic solution containing about 1.5% of sodium hydroxide is prepared, and this solution from supply tank 2 is also heated to about 120° C. and pumped into the contactor coil at a rate of about 250 parts per minute in confluence with the tallow and coconut oil. The mixture is held at a pressure of about 75 pounds per square inch while in the contactor coil, and the coil is of such dimensions that it contains about ten minutes' run of the reaction mixture. The material is ejected through the nozzle 4a into the flash chamber 7, which is under an absolute pressure of about 2 inches of mercury, and the unreacted alcohol is there volatilized and is removed through the vapor outlet 10. The reaction product comprising the methyl esters of tallow and coconut oil fatty acids together with glycerine runs through the orifice 14 in the partition 9 and down the tube 15 to the mid-section of the separation chamber 8. The reaction products, still hot, there settle into layers, which are separately withdrawn. The upper layer is treated as detailed in Example I. The lower layer is treated with brine to salt out any soap formed, and the glycerine is again settled out and withdrawn.

The ester fractions obtained according to the present invention with or without washing and/or subsequent purification, can be employed in many chemical processes and products, as in the paint, perfumery, lubricating oils, medicinals and other fields. They may be used in many chemical syntheses, and one of their greatest outlets for volume consumption is in the soap-making industry. In saponifying the esters, they may be mixed with monoesters of polyhydric alcohols, such as ethylene glycol monostearate, propylene glycol monolaurate, trimethylene glycol monoesters of olive oil fatty acids, glyceryl alpha- (or beta-) monostearate, mannitol monoesters of coconut oil fatty acids, sorbitol monopalmitate, erythritol mono-oleate, etc. Any of these monoesters may also be admixed with di-, tri-, or polyesters for saponification, although such modification is not preferred.

The alkaline or saponifying agent which may be used for saponifying these esters includes sodium and potassium hydroxides, carbonates, silicates, etc., methyl morpholine, piperidine, alkyl amines, alkanolamines, and other organic and inorganic bases and alkaline materials, and mixtures of these. The alkaline agent may be introduced in aqueous solution, in alcoholic solution, or in solutions of other solvents, or may be substantially anhydrous and/or substantially undiluted. The amount of solvent introduced with the alkaline or saponifying agent has a bearing on the water or organic solvent content of the finished product.

The esters may be saponified by mixing with the alkaline agent in a soap kettle and boiling to remove the alcohol liberated, with or without recovery of the alcohol or other solvent, as desired. The reaction may be completed in the kettle or the mixture may be run into frames to complete the reaction therein, without agitation, as a cold made soap, or the mixture may be continuously agitated during the reaction without substantial cooling to yield a granulated product or a floating soap.

In an alternative saponification procedure, the esters, with or without preliminary purification, may be hydrolyzed to form the free fatty acid and an alcohol. The free fatty acid produced is then neutralized, preferably by a continuous neutralization procedure, to form soap.

In a preferred method of saponification, the soap is prepared by mixing the ester with the saponifying agent and carrying out the reaction at atmospheric, superatmospheric, or reduced pressures. A reduced pressure may be employed to remove the alcohol from the product as the alcohol is liberated in the reaction. Alternatively, the materials may be reacted at somewhat elevated temperatures and then flashed into a lower pressure chamber to volatilize the alcohols, as well as some or all of any solvent (including water) employed. A subatmospheric pressure is advantageously employed in the flash chamber to remove from the product alcohol liberated in the reaction. The reaction is preferably carried out as a continuous process, using a measuring or proportioning device for mixing the ingredients in such proportions as are determined by the operator, and then continuously passing them to a saponifier. An advantageous method of operation is to mix the esters and saponifying agents at an elevated temperature and under pressure and then to flash them into a separation chamber under reduced pressure, thereby vaporizing any solvent used and the alcohol formed in the reaction.

The moisture or solvent content of the finished product can be modified by regulating the heat supplied to the reaction mixture by preheating the reactants and/or externally heating the reaction vessel or otherwise. The temperature required is far below that necessary for glycerine recovery in saponifying glycerides, being of the order of about 50° C. to about 125° C. Therefore, although possible, it is unnecessary and less desirable to go to the temperature of molten anhydrous soap or higher in order to vaporize the monohydric alcohols liberated, as they or their aqueous azeotropes are lower boiling than water. Furthermore, it is possible to recover the soap in hydrated form, but free from the alcohol, without additional hydrating equipment, as required with anhydrous soap obtained in certain methods of saponifying glycerides. Moreover, shorter periods of heating, with consequent diminished danger of local overheating and decomposition, can be employed.

Soap builders, inert materials, antioxidants, etc., may be added to the ester and/or to the saponifying agent before contacting. Since the washing steps, in general use in prior art practice, need not be employed after contacting the materials, these modifying agents, even if water-soluble, are found in the product. Adjuvant materials may be admixed with the soaps by mixing them with the esters and/or the saponifying agents before flashing, by simultaneously flashing a second solution containing such adjuvant materials, and/or by mixing the final product therewith. Such adjuvant materials may include fatty acid soaps prepared by the same or other methods, resin acid soaps, naphthenic and alkylated naphthenic acid soaps, sulphated and sulphonated organic compounds; alkaline soap builders, water-soluble, water-softening, acid compounds of phosphorus, and other salts, including sodium carbonate, sodium silicates, trisodium phosphates, borax, sodium tetraphosphate, sodium bicarbonate, sodium sulphate, sodium chloride, sodium acetate, sodium hypochlorite, sodium thiosulphate, sodium perborate, sodium tartrate, sodium citrate and sodium oxalate, and the corresponding ammonium, substituted ammonium and potassium salts of the corresponding acids; insecticidal, germicidal, styptic and medicinal agents, including aluminum chloride, mercuric chloride and various copper and lead salts; coloring agents, abrasives, fillers, and water-dispersible gums, including dyes, lakes, pigments, silica, kieselguhr, silica gel, feldspar, precipitated chalk, pumice, infusorial earth, bentonite, talc, starch, Irish moss, sugar, methyl cellulose, agar, gum tragacanth, gum arabic, and polyvinyl alcohols; liquids, such as ethyl alcohol, glycerol, cyclohexanol, naphtha, benzene, kerosene, turpentine, pine oil, decalin and tetralin and the like. The type of addition agent will depend upon the ultimate use of the new composition.

The soap may be recovered as a fluid, plastic or granular product and may be used in the form produced or may be forced through an extrusion outlet after flashing and cut in the form of bars and cakes, or it may be ejected through a spray nozzle or spinner bowl into a spray tower to give beads and spongy granules. It may also be passed to drum driers, or, if drying is accomplished by other means, to chilling rolls to produce flakes and ribbons.

Although the present invention has been described with reference to particular embodiments and examples, it will be apparent to those skilled in the art that variations and modifications of this invention can be made and that equivalents can be substituted therefor without departing from the principles and true spirit of the invention. Such variations and modifications are believed to be within the scope of the present specification and within the purview of the appended claims.

I claim:

1. A process for the alcoholysis of fatty glycerides which comprises reacting a fatty glyceride with a low molecular weight monohydric alcohol in the presence of an alcoholysis catalyst selected from the group consisting of alkaline and neutral catalysts to produce a liquid body containing esters of fatty acids from said glyceride with said alcohol, glycerine and unreacted alcohol; volatilizing the unreacted alcohol from said liquid body; and separating said esters from the glycerine.

2. The process as set forth in claim 1 wherein the fatty glyceride and the alcohol are reacted in the presence of an alkaline alcoholysis catalyst.

3. A process for the alcoholysis of fatty glycerides which comprises reacting a fatty glyceride with a monohydric aliphatic alcohol having one to about six carbon atoms per molecule in the presence of an alkaline alcoholysis catalyst to produce a liquid body containing alkyl esters, glycerine and unreacted alcohol; distilling the unreacted alcohol from said liquid body to leave a residue having an upper layer containing alkyl esters and a lower layer containing glycerine; and separating the upper layer from the lower layer.

4. A process for the alcoholysis of fatty glycerides which comprises reacting a fatty glyceride with methyl alcohol in the presence of an alkaline alcoholysis catalyst to produce a liquid body containing methyl esters, glycerine and unreacted methyl alcohol; distilling the unreacted alcohol from said liquid body to leave a residue having an upper layer containing methyl esters and a lower layer containing glycerine; and separating the upper layer from the lower layer.

5. A process for the alcoholysis of fatty glycerides which comprises reacting a fatty glyceride with ethyl alcohol in the presence of an alkaline alcoholysis catalyst to produce a liquid body containing ethyl esters, glycerine and unreacted ethyl alcohol; distilling the unreacted alcohol from said liquid body to leave a residue having an upper layer containing ethyl esters and a lower layer containing glycerine; and separating the upper layer from the lower layer.

6. A process for the alcoholysis of fatty glycerides which comprises reacting a fatty glyceride with an aliphatic monohydric alcohol having 1 to about 6 carbon atoms per molecule in the presence of an alkaline alcoholysis catalyst to produce a liquid body containing alkyl esters, glycerine and unreacted alcohol; distilling the unreacted alcohol from said liquid body under reduced pressure to leave a residue having an upper layer containing alkyl esters and a lower layer containing glycerine; and withdrawing said lower glycerine-containing layer.

7. A process for the alcoholysis of fatty glycerides which comprises contacting a fatty glyceride with an aliphatic monohydric alcohol having 1 to about 6 carbon atoms per molecule in the presence of an alkaline alcoholysis catalyst and at about room temperature to form a reaction mixture; maintaining said mixture for a relatively short time at a temperature sufficient to cause rapid alcoholysis but below the temperature of substantial homogeneity of the resulting mixture in the absence of alcohol, whereby a liquid body containing alkyl esters, glycerine and unreacted alcohol is produced; distilling unreacted alcohol from said liquid body under reduced pressure to leave a residue having an upper layer containing alkyl esters and a lower layer containing glycerine; and separating the upper layer from the lower layer.

8. A process for the alcoholysis of fatty glycerides which comprises reacting a fatty glyceride with an aliphatic monohydric alcohol having 1 to about 6 carbon atoms per molecule in the presence of an alkaline alcoholysis catalyst, whereby a liquid body containing alkyl esters, glycerine and unreacted alcohol is produced; flashing said liquid body into a lower pressure zone to volatilize unreacted alcohol therefrom and to leave a residue having an upper layer containing alkyl esters and a lower layer containing glycerine; and separating the upper layer from the lower layer.

9. A process for the alcoholysis of fatty glycerides which comprises reacting a fatty glyceride with methyl alcohol in the presence of an alkaline alcoholysis catalyst at a temperature sufficient to cause rapid alcoholysis, whereby a liquid body containing methyl esters, glycerine and unreacted methyl alcohol is produced; flashing said liquid body into a reduced pressure zone at a temperature sufficient to vaporize methyl alcohol therefrom but to an end temperature below the temperature of substantial reversal of the reaction in the absence of alcohol and to leave a residue having an upper layer containing methyl esters and a lower layer containing glycerine; and withdrawing said lower glycerine-containing layer.

10. A process for the alcoholysis of fatty glycerides which comprises reacting a fatty glyceride with ethyl alcohol in the presence of an alkaline alcoholysis catalyst at a temperature sufficient to cause rapid alcoholysis, whereby a liquid body containing ethyl esters, glycerine and unreacted ethyl alcohol is produced; flashing said liquid body into a reduced pressure zone at a temperature sufficient to vaporize ethyl alcohol therefrom but to an end temperature below the temperature of substantial homogeneity of the resulting mixture in the absence of alcohol and to leave a residue having an upper layer containing ethyl esters and a lower layer containing glycerine; and withdrawing said lower glycerine-containing layer.

11. A process for the alcoholysis of fatty glycerides which comprises contacting a fatty glyceride with a low molecular weight monohydric aliphatic alcohol in the presence of an alkaline alcoholysis catalyst to produce a liquid body containing alkyl esters, glycerine and unreacted alcohol; distilling the unreacted alcohol from said liquid body at a temperature below the temperature of substantial reversal of the reaction in the absence of alcohol to leave a residue having an upper layer containing alkyl esters and a lower layer containing glycerine; and separating the upper layer from the lower layer.

12. A continuous process for the alcoholysis of fatty acid glycerides which comprises bringing a stream of fatty acid glycerides into contact with a stream of lower monohydric alcohol in the presence of an alkaline alcoholysis catalyst; reacting the fatty acid glyceride and alcohol to produce a liquid reaction product containing esters of the alcohol and fatty acids, glycerine and unreacted alcohol; continuously introducing a stream of said liquid reaction product into a flash chamber at lower pressure to flash unreacted alcohol into vapor and leave a liquid residue containing esters and glycerine; continuously withdrawing alcohol vapor from said chamber; continuously withdrawing liquid residue from said chamber and introducing the same into a mass of liquid residue in a separating chamber; effecting separation of the mass of liquid residue into an upper layer containing the esters and a lower layer containing the glycerine; continuously withdrawing esters from the upper layer and continuously withdrawing glycerine from the lower layer; the place of introduction of the liquid residue into the separating chamber being between the levels where the esters and glycerine, respectively, are withdrawn.

WALTER RUSSELL TRENT.